United States Patent
Zhang

(10) Patent No.: US 12,086,320 B2
(45) Date of Patent: Sep. 10, 2024

(54) METHOD AND DEVICE FOR HAPTIC FEEDBACK

(71) Applicant: AAC Acoustic Technologies (Shanghai) Co., Ltd., Shanghai (CN)

(72) Inventor: Xiaoyu Zhang, Shanghai (CN)

(73) Assignee: AAC Acoustic Technologies (Shanghai)Co., Ltd., Shanghai (CN)

( * ) Notice: Subject to any disclaimer, the term of this patent is extended or adjusted under 35 U.S.C. 154(b) by 0 days.

(21) Appl. No.: 18/331,123

(22) Filed: Jun. 7, 2023

(65) Prior Publication Data

US 2024/0143081 A1    May 2, 2024

Related U.S. Application Data

(63) Continuation of application No. PCT/CN2023/078971, filed on Mar. 1, 2023.

(30) Foreign Application Priority Data

Oct. 26, 2022  (CN) .......................... 202211320727.9

(51) Int. Cl.
G06F 3/01      (2006.01)
(52) U.S. Cl.
CPC .................................. *G06F 3/016* (2013.01)

(58) Field of Classification Search
CPC . G06F 3/016; G06F 3/01; G06F 3/023; G06F 3/0233
See application file for complete search history.

(56) References Cited

U.S. PATENT DOCUMENTS

| | | | |
|---|---|---|---|
| 10,796,542 B1* | 10/2020 | Bennett | G06F 3/165 |
| 2022/0379201 A1* | 12/2022 | Stevens | A63F 13/533 |
| 2024/0013802 A1* | 1/2024 | Federov | G10L 25/30 |

FOREIGN PATENT DOCUMENTS

CN          112925417 A  *  6/2021  ............. G06F 3/016

* cited by examiner

*Primary Examiner* — Sahlu Okebato
(74) *Attorney, Agent, or Firm* — W&G Law Group

(57) ABSTRACT

A method for haptic feedback, a device for haptic feedback, and a storage device are provided. The method includes the following. In response to a session information editing operation from a first user, session information is generated, where the session information includes Morse code character information. In response to a sending operation from the first user, the session information is sent to a data platform for a second electronic device to obtain the session information from the data platform and to generate haptic feedback according to the session information. In the technical solutions provided in the embodiments of the disclosure, information is sent through the Morse code by utilizing the characteristics of the Morse code, thus simplifying the communication process, improving the interest in the communication process, and improving the user experience.

10 Claims, 7 Drawing Sheets

METHOD AND DEVICE FOR HAPTIC FEEDBACK

TECHNICAL FIELD

The various embodiments described in this document relate in general to the technical field of electronic communication, and more specifically to a method and device for haptic feedback.

BACKGROUND

Social interaction is one of the most important social activities in human society. In the early days, people mainly relied on language and body to communicate with each other. With the development of human civilization, characters have emerged as a carrier. Because of the recordability of characters, social communication is no longer limited to face-to-face communication, so there is a communication mode in which communication media such as letters and characters are integrated. The second industrial revolution has brought telephone to human society. The evolution of radio technology and the substantial improvement of productivity level have made mobile phones enter thousands of households. The Internet born in the post-industrial revolution era (also known as the third industrial revolution) has greatly changed people's communication and expression modes. The popularity of mobile Internet has promoted the convenience and wisdom of communication in human society to an unprecedented height. However, in the existed technologies, the information transmission modes provided by various social platforms are still complex, the information transmission process is boring, and the user experience is low.

SUMMARY

In view of above, embodiments of the disclosure provide a method for haptic feedback, a device for haptic feedback, and a storage medium, which can solve the problems of complex information transmission mode, boring information transmission process, and low user experience in the existed technologies.

According to a first aspect, embodiments of the disclosure provide a method for haptic feedback. The method includes the following. Session information is generated in response to a session information editing operation from a first user, where the session information includes Morse code character information. In response to a sending operation from the first user, the session information is sent to a data platform for a second electronic device to obtain the session information from the data platform and to generate haptic feedback according to the session information.

In some embodiments, the session information editing operation comprises a character information editing operation, the session information comprises character information, and the character information includes the Morse code character information.

In some embodiments, the session information editing operation further comprises an emotional state editing operation, and the session information further comprises emotional state information sent synchronously with the character information.

In some embodiments, the emotional state information comprises an emotional state and a haptic feedback parameter corresponding to the emotional state.

In some embodiments, the haptic feedback parameter comprises at least one of a haptic feedback intensity, a haptic feedback frequency, and a haptic feedback time.

According to a second aspect, embodiments of the disclosure provide a method for haptic feedback. The method includes the following. Session information is received from a data platform, where the session information is generated by a first electronic device in response to a session information editing operation from a first user and sent to the data platform in response to a sending operation from the first user, and the session information includes Morse code character information. Haptic feedback is generated according to the session information.

In some embodiments, the session information comprises character information, the character information includes the Morse code character information, and the haptic feedback comprises first haptic feedback according to the character information.

In some embodiments, the session information further comprises emotional state information sent synchronously with the character information, and the haptic feedback further comprises second haptic feedback according to the character information and the emotional state information.

According to a third aspect, embodiments of the disclosure provide a device for haptic feedback. The device for haptic feedback includes a first generating module and a sending module. The first generating module is configured to generate session information in response to a session information editing operation from a first user, wherein the session information includes Morse code character information. The sending module is configured to send the session information to a data platform in response to a sending operation from the first user, for a second electronic device to obtain the session information from the data platform and generate haptic feedback according to the session information.

According to a third aspect, embodiments of the disclosure provide a device for haptic feedback. The device for haptic feedback includes a receiving module and a second generating module. The receiving module is configured to receive session information from a data platform, wherein the session information is generated by a first electronic device in response to a session information editing operation from a first user and sent to the data platform in response to a sending operation from the first user, and the session information includes Morse code character information. The second generating module is configured to generate haptic feedback according to the session information.

In the technical solutions provided in the embodiments of the disclosure, the first electronic device generates the session information in response to the session information editing operation from the first user, and sends the session information to the data platform in response to a transmission operation from the first user. The second electronic device obtains the session information from the data platform and generates the second haptic feedback according to the session information. In the technical solutions provided in the embodiments of the disclosure, information is sent through the Morse code by utilizing the characteristics of the Morse code, thus simplifying the communication process, improving the interest in the communication process, and improving the user experience.

BRIEF DESCRIPTION OF THE DRAWINGS

In order to more clearly explain that embodiments of the disclosure, the drawings required for use in the embodiments will be briefly described below, and it will be apparent that the drawings described below are only some of the embodiments of the disclosure, from which other drawings may be obtained without creative effort by a person of ordinary skill in the art.

DETAILED DESCRIPTION OF THE EMBODIMENTS

In order to make the objects, technical solutions, and advantages of the embodiments of the disclosure clearer, the technical aspects of the embodiments of the disclosure will be clearly and completely described below in conjunction with the accompanying drawings in the embodiments of the disclosure, and it will be apparent that the described embodiments are part of, but not all the embodiments of the disclosure. Based on the embodiments in the present disclosure, all other embodiments obtained by those of ordinary skill in the art without making creative efforts are within the scope of protection of the present disclosure.

It is to be noted that the described embodiments are only part of embodiments and not all embodiments of the disclosure. Based on the embodiments in the disclosure, all other embodiments obtained without creative effort by those of ordinary skill in the art fall within the scope of protection of the disclosure.

Terms used in embodiments of the disclosure are for the purpose of describing specific embodiments only and are not intended to limit the disclosure. Singular forms "an", "said", and "the" as used in embodiments of the disclosure and in the appended claims are also intended to include a plurality of forms, unless the context clearly dictates otherwise.

It can be understood that the term "and/or" used herein is merely an association relationship that describes an associated object, indicating that there can be three relationships. For example, the expression "A and/or B" may include three cases: A exists alone, A and B exist at the same time, and B exists alone. In addition, the character "/" herein generally indicates that related objects are a kind of "or" relationship.

It can be understood that in the context, the word "if" as used herein may be interpreted as "when" or "in response to determining" or "in response to detecting". Similarly, depending on the context, the phrases "if (stated condition or event) is determined" or "if (stated condition or event) is detected" can be interpreted as "when (stated condition or event) is determined" or "in response to (stated condition or event) being determined" or "when (stated condition or event) is detected" or "in response to (stated condition or event) being detected".

Figure 1:
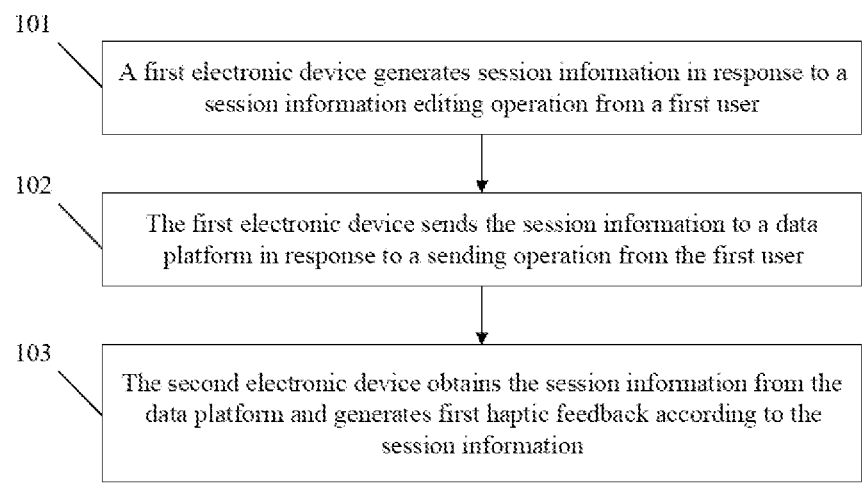
FIG. 1 is a flow chart of a method for haptic feedback according to an embodiment of the present disclosure.

FIG. 1 is a flow chart of a method for haptic feedback according to an embodiment of the present disclosure. As illustrated in FIG. 1, the method includes the following.

At 101, a first electronic device generates session information in response to a session information editing operation from a first user.

In embodiments of the disclosure, the first electronic device includes but is not limited to a mobile phone, a tablet computer, a portable personal computer (PC), a wearable device, and the like.

In operations at 101, the session information includes character information. The character information includes Morse code character information, and the Morse code character information includes first character information and/or second character information.

Alternatively, the session information editing operation includes a character information editing operation, and the character information editing operation includes an operation in which the first user clicks a character editing button at least one time on a sending interface of the first electronic device.

Figure 2:
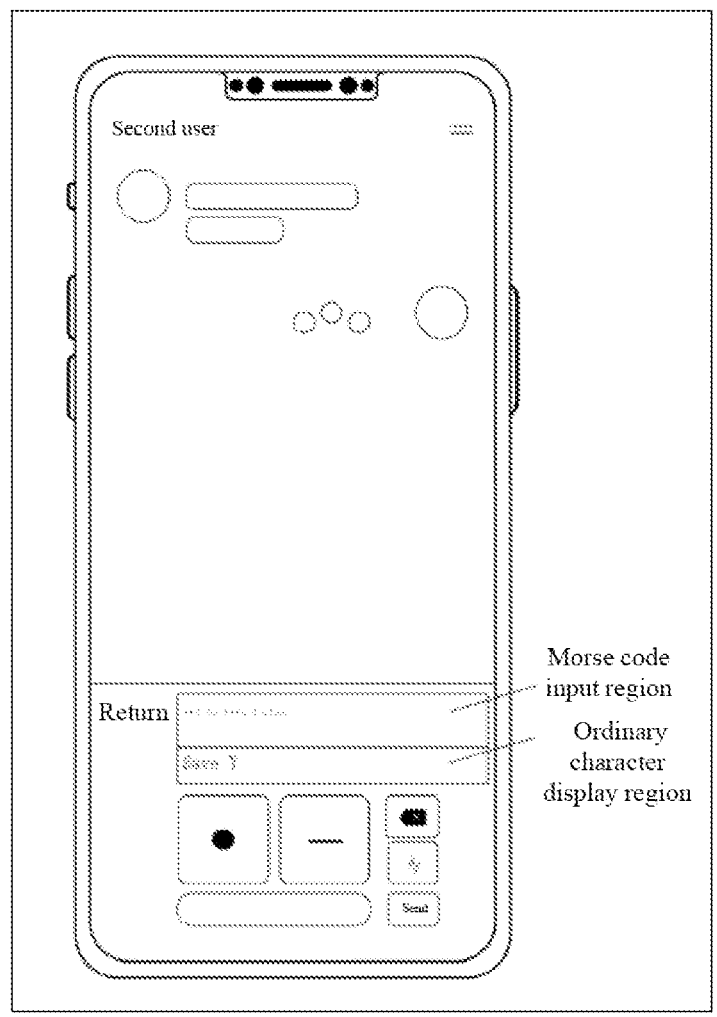
FIG. 2 is a schematic diagram of a sending interface of a first electronic device according to an embodiment of the present disclosure.

FIG. 2 is a schematic diagram of a sending interface of a first electronic device according to an embodiment of the present disclosure. As shown in FIG. 2, the sending interface of the first electronic device includes a character editing button, a return button, a Morse code input region, and an ordinary character display region. The character editing button includes a first character button, a second character button, a space button, a delete button, and a finish button. When the first user clicks the return button, the first electronic device returns to an upper-level operation interface in response to an return button clicking operation from the first user. When the first user clicks the first character button, the first electronic device generates first character information in response to a first character button clicking operation from the user. When the first user clicks the second character button, the first electronic device generates second character information in response to a second character button clicking operation from the first user. When the first user clicks the space button, the first electronic device generates a space separator in response to a space button clicking operation from the first user, where the space separator is used for separating Morse code characters corresponding to ordinary characters of different groups. When the first user clicks the delete button, the first electronic device deletes the last of Morse code characters in the Morse code input region in response to a delete button clicking operation from the first user. When the first user clicks the finish button, the first electronic device generates a completion separator in response to a finish button clicking operation from the first user, and the completion separator is used for separating different groups of Morse code characters. The first character button includes "·" button, the second character button includes "–" button, the first character information includes "•" character information, and the second character information includes "–" character information.

The first user clicks the character editing button on the sending interface of the first electronic device at least one time, and the first electronic device generates character information in response to at least one character editing button clicking operation from the first user. For example, when the first user clicks the first character button three times and the finish button one time, the first electronic device generates " . . . " character information and a finish separator. When the first user clicks the first character button one time, clicks the second character button one time, and clicks the finish button one time, the first electronic device generates "·–" character information and a finish separator. When the first user clicks the first character button three times, clicks the second character button one time, and clicks the finish button one time, the first electronic device generates " . . . –" character information and a finish separator. When the first user clicks the first character button one time and the finish button one time, the first electronic device generates "•" character information. When the first user clicks the space button one time, the first electronic device generates a space separator. When the first user clicks the second character button one time, clicks the first character button one time, clicks the second character button two times, and clicks the finish button one time, the first electronic device generates "–·––" character information and a finish separator. The first electronic device generates character information of " . . . ·– . . . –·–––" in response to a plurality of character editing button clicking operations from the first user.

The first electronic device generates Morse code character information in response to the character editing operation from the first user and displays the Morse code character information on a Morse code input region. The first electronic device performs character conversion on the Morse code character information according to a preset corresponding relationship between ordinary characters and Morse code characters, generates ordinary character information corresponding to Morse code character information, and displays the ordinary character information corresponding to Morse code character information on an ordinary character display region.

As shown in Table 1 below, Table 1 shows the corresponding relationship between ordinary characters and Morse code characters.

TABLE 1

| Ordinary characters | Morse code characters |
|---|---|
| A | ·– |
| B | –··· |
| C | –·–· |
| D | –·· |
| E | · |
| F | ··–· |
| G | ––· |
| H | ···· |
| I | ·· |
| J | ·––– |
| K | –·– |
| L | ·–·· |
| M | –– |
| N | –· |
| O | ––– |
| P | ·––· |
| Q | ––·– |
| R | ·–· |
| S | ··· |
| T | – |
| U | ··– |
| V | ···– |
| W | ·–– |
| X | –··– |
| Y | –·–– |
| Z | ––·· |
| 1 | ·–––– |
| 2 | ··––– |
| 3 | ···–– |
| 4 | ····– |
| 5 | ····· |
| 6 | –···· |
| 7 | ––··· |
| 8 | –––·· |
| 9 | ––––· |
| 0 | ––––– |
| ? | ··––·· |
| / | –··–· |
| ( ) | –·––·– |
| – | –····– |
| • | ·–·–·– |

As shown in Table 1 above, the Morse code character corresponding to ordinary character S is " . . . ", the Morse code character corresponding to ordinary character A is "·–", the Morse code character corresponding to ordinary character V is " . . . –", the Morse code character corresponding to ordinary character E is "•", and the Morse code character corresponding to ordinary character Y is "–·––". For example, the first electronic device generates Morse code character information "–·––" in response to the character information editing operation from the first user, and the first electronic device displays the Morse code character information " . . . ·– . . . –·–––" on the Morse code input region. The first electronic device performs character conversion on Morse code character information according to the preset corresponding relationship between the ordinary characters and the Morse code characters, generates ordinary character information of "Save Y", and displays the ordinary character information of "Save Y" in the ordinary character display region.

Alternatively, the character information editing operation includes an operation in which the first user taps on a back cover of the first electronic device. When the first user performs a first tap operation, the first electronic device generates first character information in response to the first tap operation from the first user. When the first user performs a second tap operation, the first electronic device generates second character information in response to the second tap operation from the first user. When the first user performs a third tap operation, the first electronic device generates a space separator in response to the third tap operation from the first user. As shown in FIG. 2, when the first user clicks the character editing button at least one time, the first electronic device generates status information being inputted in response to at least one character button clicking operation from the first user, where the status information being inputted includes text information and/or graphic information. For example, the status information being inputted includes three circles on a first user side of the sending interface.

At 102, the first electronic device sends the session information to a data platform in response to a sending operation from the first user.

Alternatively, the sending operation includes a sending button clicking operation.

As shown in FIG. 2, the sending interface of the first electronic device further includes a sending button. After the first user confirms that the Morse code character information displayed in the Morse code input region is correct and then clicks the sending button, the first electronic device sends the Morse code character information and the ordinary character information corresponding to the Morse code character information to the data platform in response to the sending button clicking operation from the first user, such that the data platform sends the Morse code character information and the ordinary character information corresponding to the Morse code character information to the second electronic device.

Alternatively, the sending operation includes an operation of not tapping the back cover for a preset time interval. If the first user does not perform the first tap operation or the second tap operation on the back cover of the first electronic device within the preset time interval, the first electronic device sends the generated character information to the data platform, and the data platform sends the character information to an electronic device held by an information transmission object preset by the first user. For example, if the information transmission object preset by the first user is a second user and the electronic device held by the second user is a second electronic device, the data platform sends the character information to the second electronic device.

At 103, the second electronic device obtains the session information from the data platform and generates first haptic feedback according to the session information.

In operations at 103, the first haptic feedback includes at least one of first character haptic feedback, second character haptic feedback, third character haptic feedback, and fourth character haptic feedback. The first character information corresponds to the first character haptic feedback, the second character information corresponds to the second character haptic feedback, the third character information corresponds to the third character haptic feedback, and the fourth character information corresponds to the fourth character haptic feedback. For example, the first character information is "·", and the first character haptic feedback is short vibration once. The second character information is "–", and the second character haptic feedback is long vibration once. The third character information is the completion separator, and the third character haptic feedback is fast short vibration twice. The fourth character information is a space separator, and the fourth character haptic feedback is fast long vibration twice. For example, if the completion separator is a " " character, and the character information received by the second electronic device includes Morse code character information "·– . . . " and ordinary character information "AS", where there is a completion separator between the character "·–" and the character " . . . ", the first haptic feedback generated by the second electronic device includes short vibration once, long vibration once, fast short vibration twice, short vibration once, short vibration once, and short vibration once.

In the technical solutions according to embodiments of the disclosure, the first electronic device generates the character information in response to the session information editing operation from the first user. The first electronic device sends, in response to the sending operation from the first user, session information to the data platform for the second electronic device to obtain the session information from the data platform and to generate haptic feedback according to the session information. In the technical solutions provided in the embodiments of the disclosure, information is sent through the Morse code by utilizing the characteristics of the Morse code, thus simplifying the communication process, improving the interest in the communication process, and improving the user experience.

In the technical solutions according to the embodiments of the disclosure, the first electrode device can generate character information when the first user taps the back cover of the first electronic device, that is, the communication can be completed without taking out the first electronic device, thus improving the convenience of information transmission.

Figure 3:
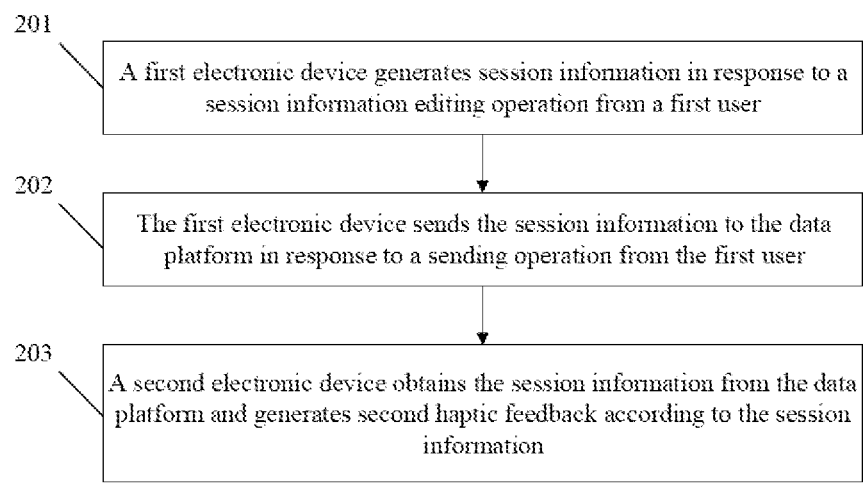
FIG. 3 is a flow chart of a method for haptic feedback according to another embodiment of the present disclosure.

FIG. 3 is a flow chart of a method for haptic feedback according to another embodiment of the present disclosure. As illustrated in FIG. 3, the method begins at 201.

At 201, a first electronic device generates session information in response to a session information editing operation from a first user.

In embodiments of the disclosure, the first electronic device includes but is not limited to a mobile phone, a tablet computer, a portable PC, a wearable device, and the like.

In operations at 101, the session information includes character information and emotional state information. For the character information, reference may be made to the illustration of operations at 101, which are not repeated herein.

The first electronic device generates emotional state information in response to an emotional state editing operation from the first user. The emotional state information includes an emotional state and haptic feedback parameters corresponding to the emotional state.

As shown in FIG. 2, a sending interface of the first electronic device further includes a menu button. The first user clicks the menu button, and an emotional state information setting interface pops up on the first electronic device in response to a menu button clicking operation from the first user.

Figure 4:
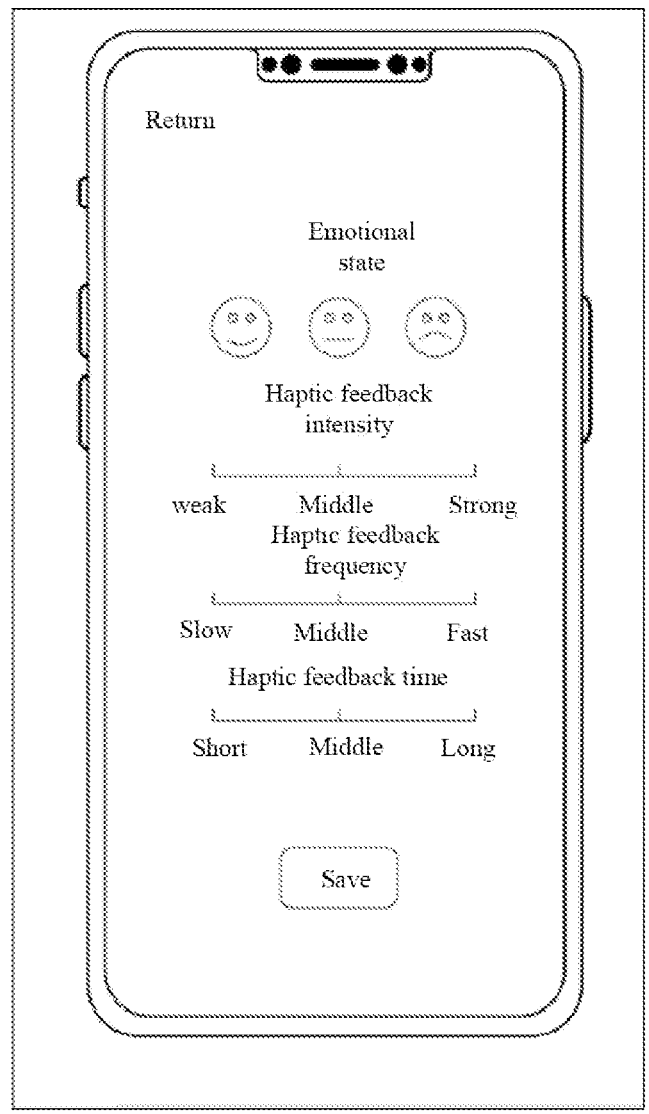
FIG. 4 is a schematic diagram of an emotional state setting interface according to an embodiment of the present disclosure.

FIG. 4 is a schematic diagram of an emotional state setting interface according to an embodiment of the present disclosure. As shown in FIG. 4, the emotional state setting interface includes three kinds of emotional states, a haptic feedback intensity slider, a haptic feedback frequency slider, a haptic feedback time slider, and a return button. The three kinds of emotional states include "happy", "serenity", and "unhappy". The first user selects an emotional state, clicks a position point on the haptic feedback intensity slider or slides the haptic feedback intensity slider to a position point to set a haptic feedback intensity corresponding to the emotional state. Alternatively, the first user selects an emotional state, clicks a position point on the haptic feedback frequency slider or slides the haptic feedback frequency slider to a certain position point to set a haptic feedback frequency corresponding to the emotional state. Alternatively, the first user selects an emotional state, clicks a certain position point on the haptic feedback time slider or slides the haptic feedback time slider to a position point to set a haptic feedback time corresponding to the emotional state. When the first user is feeling blue, the first user may select an emotional state of "unhappy", and the haptic feedback intensity corresponding to "unhappy" is set to be lower, the haptic feedback frequency corresponding to "unhappy" is set to be lower, and the haptic feedback time corresponding to "unhappy" is set to be longer. When the first user feels good, the first user may select an emotional state of "happy", and the haptic feedback intensity corresponding to "happy" is set to be higher, the haptic feedback frequency corresponding to "happy" is set to be higher, and the haptic feedback time corresponding to "happy" is set to be shorter. For example, when the first user is in a positive emotional state, i.e., the first user feels warm, intimate, and trust, and the like, he/she can choose an emotional state of "happy". Alternatively, when the first user is in a negative emotional state, i.e., the first user feels pain, discomfort, and aggressiveness, he/she can choose an emotional state of "unhappy".

Optionally, the emotional state setting interface can further include a haptic feedback intensity value box, a haptic feedback frequency value box, and a haptic feedback time value box. The first user can set specific haptic feedback parameter values for the emotional state in the corresponding value boxes. For example, the first user sets the haptic feedback frequency corresponding to the "happy" to be 2 times/s and the haptic feedback time corresponding to the "happy" to be 2s.

As shown in FIG. 4, the emotional state setting interface further includes a save button. After the first user edits the emotional state information, the first user clicks the save button, and the first electronic device saves the set emotional state information to the first electronic device in response to a save button clicking operation from the first user.

At 202, the first electronic device sends the session information to the data platform in response to a sending operation from the first user.

In operations at 202, the first electronic device synchronously sends the character information and the emotional state information to the data platform in response to the sending operation from the first user.

At 203, a second electronic device obtains the session information from the data platform and generates second haptic feedback according to the session information.

In operations at 203, the haptic feedback parameter includes at least one of the haptic feedback intensity, the haptic feedback frequency, and the haptic feedback time. For example, the emotional state includes an emotional state of "happy", and the haptic feedback parameter corresponding to the "happy" includes a haptic feedback frequency of 2 times/s, and the second electronic device generates the second haptic feedback corresponding to the session information according to the haptic feedback frequency of 2 times/s. For example, if the session information received by the second electronic device includes "·–" character information and emotional state information corresponding to the emotional state of "happy", the second electronic device executes the second haptic feedback corresponding to the "·–" character information according to the haptic feedback frequency of 2 times/s.

In the technical solutions provided in the embodiments of the disclosure, the first electronic device generates the session information in response to the session information editing operation from the first user, and sends the session information to the data platform in response to a transmission operation from the first user. The second electronic device obtains the session information from the data platform and generates the second haptic feedback according to the session information. In the technical solutions provided in the embodiments of the disclosure, information is sent through the Morse code by utilizing the characteristics of the Morse code, thus simplifying the communication process, improving the interest in the communication process, and improving the user experience.

In the technical solutions provided in the embodiments of the disclosure, the second electronic device obtains the session information from the data platform and generates the second haptic feedback according to the session information. In the technical solutions provided in the embodiments of the disclosure, the tone factors missing in the information transmission process are expressed through the session information, and the overall tone of emotions is truly expressed, so that the haptic feedback is richer, the distance between users is narrowed, misunderstanding and conflict are reduced, trust and cooperation are promoted, and user experience is improved.

Figure 5:
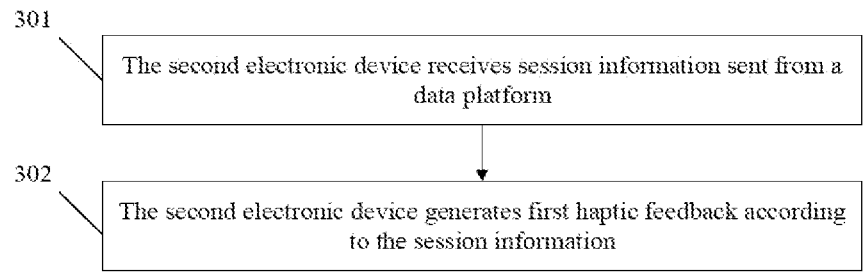
FIG. 5 is a flow chart of a method for haptic feedback according to yet another embodiment of the present disclosure.

FIG. 5 is a flow chart of a method for haptic feedback according to yet another embodiment of the present disclosure. As illustrated in FIG. 5, the method begins at 301.

At 301, the second electronic device receives session information sent from a data platform.

In embodiments of the invention, the second electronic device includes but is not limited to a mobile phone, a tablet computer, a portable PC, a wearable device, and the like.

In operations at 301, the session information includes character information. The first electronic device generates the character information in response to a character information editing operation from a first user, and sends the character information to the data platform in response to a first sending operation from the first user, and then the data platform sends the character information to the second electronic device.

At 302, the second electronic device generates first haptic feedback according to the session information.

In operations at 302, for the illustration of operations at 302, reference may be made to the operations at 103, which are not repeated herein.

In the technical solutions provided in the embodiments of the disclosure, the second electronic device receives the session information sent from the data platform and generates the haptic feedback according to the session information. In the technical solutions provided in the embodiment of the disclosure, information is sent through the Morse code by utilizing the characteristics of the Morse code, thus simplifying the communication process, improving the interest in the communication process, and improving the user experience.

Figure 7:
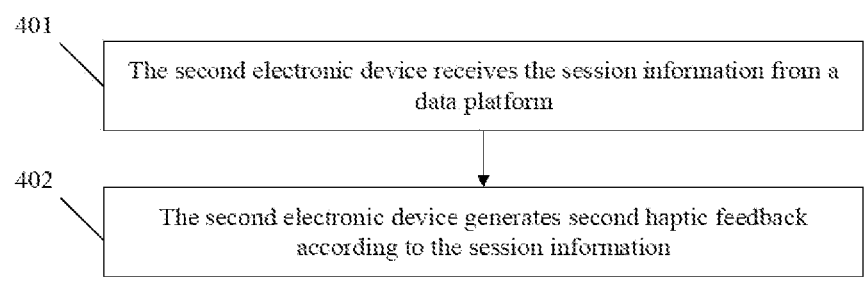
FIG. 7 is a flow chart of a method for haptic feedback according to yet another embodiment of the present disclosure.

FIG. 7 is a flow chart of a method for haptic feedback according to yet another embodiment of the present disclosure. As illustrated in FIG. 7, the method begins at 401.

At 401, the second electronic device receives the session information from a data platform.

In the embodiment of the disclosure, the second electronic device includes but is not limited to a mobile phone, a tablet computer, a portable PC, a wearable device, etc.

In operations at 401, the session information includes character information and emotional state information. Specifically, the first electronic device generates emotional state information in response to an emotional state editing operation from the first user, and sends the emotional state information to the data platform in response to a sending operation from the first user, where the emotional state information includes emotional states and haptic feedback parameters corresponding to each emotional state. The second electronic device sends a data request to the data platform according to the emotional state of the first user in response to an emotional state clicking operation from the second user. The data request includes a request for obtaining haptic feedback parameters corresponding to the emotional state set by the first user. The data platform sends the haptic feedback parameters corresponding to the emotional state to the second electronic device in response to the received data request. For example, the first user sets "happy" as the emotional state, and sets the haptic feedback intensity corresponding to the "happy" to be relatively high, sets the haptic feedback frequency corresponding to the "happy" to be relatively high, and sets the haptic feedback time corresponding to the "happy" to be relatively short.

Figure 6:
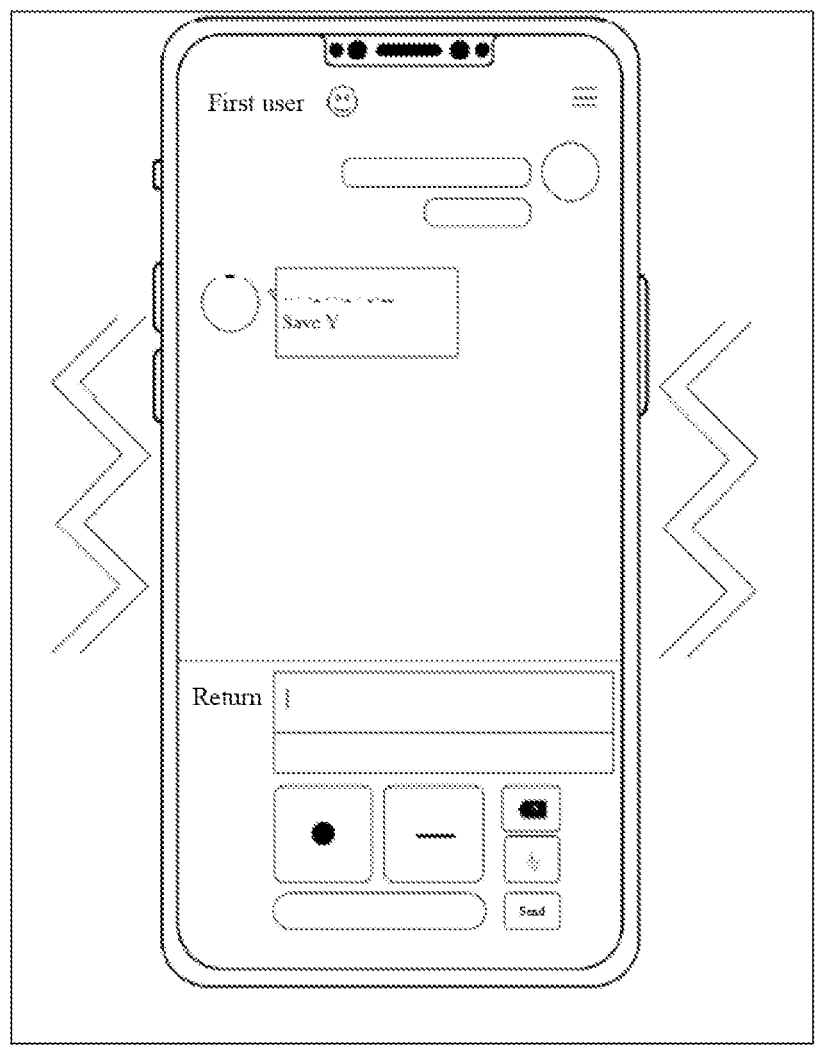
FIG. 6 is a schematic diagram of a receiving interface of a second electronic device according to an embodiment of the present disclosure.

FIG. 6 is a schematic diagram of a receiving interface of a second electronic device according to an embodiment of the present disclosure. As shown in FIG. 6, the receiving interface of the second electronic device includes a character editing button, a return button, a Morse code input region, an ordinary character display region, and an emotional state button about a first user. For the illustration of the character editing button, the return button, the Morse code input region, and the ordinary character display region, reference may be made to illustration of operations at 101, which are not repeated herein. The second user clicks the emotional state button about the first user, and the second electronic device obtains the haptic feedback parameter corresponding to the "happy" emotional state set by the first user from the data platform in response to the emotional state clicking operation from the second user. For example, the second user clicks the emotional state button of "happy" about the first user, and the second electronic device sends a data request to the data platform in response to the emotional state button clicking operation from the second user, where the data request includes a request for obtaining haptic feedback parameters corresponding to the "happy" emotional state set by the first user. The data platform sends the haptic feedback parameters corresponding to the "happy" emotional state to the second electronic device in response to the received data request. The haptic feedback parameters corresponding to the "happy" emotional state includes a haptic feedback frequency of 2 times/s and a haptic feedback time of 2s.

At 402, the second electronic device generates second haptic feedback according to the session information.

In embodiments of the present disclosure, for the illustration of operations at 402, reference may be referred to the illustration of operations at 203, which are not repeated herein.

In the technical solutions provided in the embodiments of the disclosure, the second electronic device receives session information sent by the data platform, and generates second haptic feedback based on the session information. In the technical solutions provided in the embodiments of the disclosure, information is sent through the Morse code by utilizing the characteristics of the Morse code, thus simplifying the communication process, improving the interest in the communication process, and improving the user experience.

In the technical solutions provided in the embodiments of the disclosure, the tone factors missing in the information transmission process are expressed through the session information, and the overall tone of emotions is truly expressed, so that the haptic feedback is richer, the distance between users is narrowed, misunderstanding and conflict are reduced, trust and cooperation are promoted, and user experience is improved.

The embodiment of the disclosure provides a computer-readable storage medium, and the computer-readable storage medium includes a stored program. The program, when executed, causes the device where the computer-readable storage medium is installed to execute the method for haptic feedback in the foregoing embodiments.

Embodiments of the disclosure provide a device for haptic feedback, and the device for haptic feedback is appliable to a first electronic device.

Figure 8:
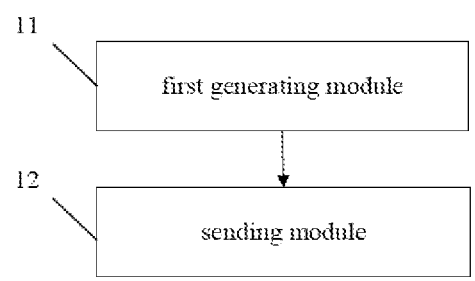
FIG. 8 is a structural schematic diagram of a device for haptic feedback according to an embodiment of the present disclosure.

FIG. 8 is a structural schematic diagram of a device for haptic feedback according to an embodiment of the present disclosure. As shown in FIG. 8, the device for haptic feedback includes a first generating module 11 and a sending module 12. The first generating module 11 is coupled with the sending module 12. The first generating module 11 is configured to generate session information in response to a session information editing operation from the first user. The session information includes Morse code character information. The sending module 12 is configured to send the session information to a data platform in response to a sending operation from the first user for the second electronic device to obtain the session information from the data platform and to generate haptic feedback according to the session information.

In the technical solutions provided in the embodiments of the disclosure, the device for haptic feedback generates the session information in response to the session information editing operation from the first user, and sends, in response to a sending operation from the first user, the session information to the data platform for the second electronic device to obtain the session information from the data platform and to generate haptic feedback according to the session information. In the technical solutions provided in embodiments of the disclosure, information is sent through the Morse code by utilizing the characteristics of the Morse code, thus simplifying the communication process, improving the interest in the communication process, and improving the user experience.

Embodiments of the disclosure provide a device for haptic feedback, and the device for haptic feedback is appliable to the second electronic device.

Figure 9:
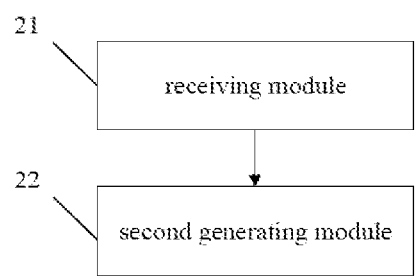
FIG. 9 is a structural diagram of a device for haptic feedback according to another embodiment of the present disclosure.

FIG. 9 is a structural diagram of a device for haptic feedback according to another embodiment of the present disclosure. As illustrated in FIG. 9, the device for haptic feedback includes a receiving module 21 and a second generating module 22. The receiving module 21 is coupled with the second generating module 22. The receiving module 21 is configured to receive session information from the data platform, where the session information is generated by the first electronic device in response to a session information editing operation form the first user and sent to the data platform in response to a sending operation from the first user. The second generating module 22 is configured to generate haptic feedback according to the character information.

In the technical solutions provided in the embodiments of the disclosure, the device for haptic feedback receives the session information sent by a data platform and generates haptic feedback according to the session information. In the technical solutions provided in the embodiments of the disclosure, information is sent through the Morse code by utilizing the characteristics of the Morse code, thus simplifying the communication process, improving the interest in the communication process, and improving the user experience.

Figure 10:
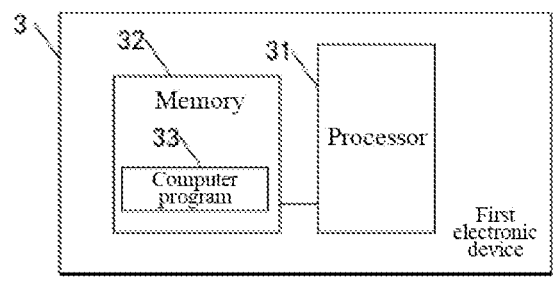
FIG. 10 is a schematic diagram of a first electronic device according to an embodiment of the present disclosure.

FIG. 10 is a schematic diagram of a first electronic device according to an embodiment of the present disclosure. As illustrated in FIG. 10, the first electronic device 3 includes a processor 31 and a memory 32. The memory 31 stores a computer program 33, and the computer program 33 is executable on the processor 31. The computer program 33, when executed by the processor 31, causes the processor 31 to perform the method described in the foregoing embodiments of the disclosure.

The first electronic device 3 includes, but is not limited to, a processor 31 and a memory 32. Those skilled in the art will appreciate that FIG. 10 is merely an example of the first electronic device 3 and does not constitute a limitation of the first electronic device 3, and may include more or fewer components than illustrated, or a combination of certain components, or different components, such as a network device, or may also include an input-output device, a network access device, a bus, and the like.

The processor 31 may be a central processing unit (CPU), another general-purpose processor, a digital signal processor (DSP), an application specific integrated circuit (ASIC), a field-programmable gate array (FPGA), or other programmable logic devices, discrete gates, or transistor logic devices, discrete hardware components, and the like. The general-purpose processor may be a microprocessor or the processor, or may be any conventional processor or the like.

The memory 32 may be an internal storage unit of the first electronic device 3 such as a hard disk or memory of the first electronic device 3. The memory 32 may also be an external storage device of the first electronic device 3, such as a plug-in hard disk, a Smart media card (SMC), a secure digital (SD) card, a flash card, or the like provided on the first electronic device 3. Furthermore, the memory 32 may also include both an internal storage unit of the first electronic device 3 and an external storage device. The memory 32 is used to store computer programs and other programs and data required by the network device. The memory 32 may also be used to temporarily store data that has been output or will be output.

Figure 11:
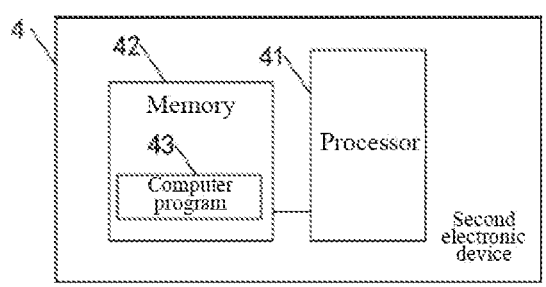
FIG. 11 is a schematic diagram of a second electronic device according to an embodiment of the present disclosure.

FIG. 11 is a schematic diagram of a second electronic device according to an embodiment of the present disclosure. As illustrated in FIG. 11, the second electronic device includes a processor 41 and a memory 42. The memory 42 stores a computer program 43, and the computer program 43 is executable on the processor 41. The computer program 43, when executed by the processor 41, causes the processor 41 to perform the method described in the foregoing embodiments of the disclosure, which is not described here to avoid repetition.

The second electronic device 4 includes, but is not limited to, a processor 41 and a memory 42. Those skilled in the art will appreciate that FIG. 11 is merely an example of the second electronic device 4 and does not constitute a limitation of the second electronic device 4, and may include more or fewer components than illustrated, or a combination of certain components, or different components, such as a network device, or may also include an input-output device, a network access device, a bus, and the like.

The processor 41 may be a CPU, another general-purpose processor, a DSP, an ASIC, a FPGA, or other programmable logic devices, discrete gates, or transistor logic devices, discrete hardware components, and the like. The general-purpose processor may be a microprocessor or the processor, or may be any conventional processor or the like.

The memory 42 may be an internal storage unit of the second electronic device 4 such as a hard disk or memory of the second electronic device 4. The memory 42 may also be an external storage device of the second electronic device 4, such as a plug-in hard disk, a SMC, a SD card, a flash card, or the like provided on the second electronic device 4. Furthermore, the memory 42 may also include both an internal storage unit of the second electronic device 4 and an external storage device. The memory 42 is used to store computer programs and other programs and data required by the network device. The memory 42 may also be used to temporarily store data that has been output or will be output.

Those skilled in the art will clearly appreciate that, for convenience and conciseness of description, for the specific operating processes of the above-described systems, apparatuses, and units, reference may be made to the corresponding processes in the foregoing method embodiments, which are not repeated herein.

In the description of this specification, descriptions of the reference terms "one embodiment", "some embodiments", "example", "specific example", or "some examples", or the like mean that specific features, structures, materials, or features described in connection with the embodiment or example are included in at least one embodiment or example of the invention. In this specification, the schematic formulation of the above terms does not need to be directed to the same embodiments or examples. Furthermore, the specific features, structures, materials, or features described may be combined in a suitable manner in any one or more embodiments or examples. Moreover, without contradicting one another, those skilled in the art may combine and combine different embodiments or examples described in this specification and features of different embodiments or examples.

Any process or method description in the flow chart or otherwise described herein may be understood as representing a module, fragment, or portion of code comprising one or more executable instructions for implementing steps of a customized logical function or process, and the scope of the preferred embodiments of the disclosure encompasses further implementations in which functions may be performed in a substantially simultaneous manner or in reverse order, not in the order shown or discussed, including in accordance with the functions involved, as will be understood by those skilled in the art to which embodiments of the invention belong.

It can be understood that in the context, the word "if" as used herein may be interpreted as "when" or "in response to determining" or "in response to detecting". Similarly, depending on the context, the phrases "if (stated condition or event) is determined" or "if (stated condition or event) is detected" can be interpreted as "when (stated condition or event) is determined" or "in response to (stated condition or event) being determined" or "when (stated condition or event) is detected" or "in response to (stated condition or event) being detected".

In several embodiments provided in the present disclosure, it shall be understood that the disclosed systems and methods may be implemented in other ways. For example, the above-described system embodiments are only schematic, for example, the division of the units is only a logical functional division, which can be implemented in another way. For example, multiple units or components can be combined or integrated into another system, or some features can be ignored or not performed. On the other hand, the coupling or direct coupling or communication connection between each other shown or discussed may be indirect coupling or communication connection through some interface, device, or unit, and may be electrical, mechanical, or other form.

The foregoing embodiments are merely some embodiments of the disclosure and are not intended to limit the present disclosure. Any modifications, equivalents, modifications, or the like made within the spirit and principles of the present disclosure should be included within the scope of protection of the present disclosure.

What is claimed is:

1. A method for haptic feedback, being applicable to a first electronic device and comprising:
    generating session information in response to a session information editing operation from a first user, wherein the session information includes Morse code character information; and sending, in response to a sending operation from the first user, the session information to a data platform for a second electronic device to obtain the session information from the data platform and to generate haptic feedback according to the session information;

wherein the session information editing operation comprises a character information editing operation and an emotional state editing operation, the session information comprises character information and emotional state information sent synchronously with the character information, and the character information includes the Morse code character information; the emotional state information comprises an emotional state and a haptic feedback parameter corresponding to the emotional state.

2. The method of claim 1, wherein the Morse code character information includes at least one of first character information and second character information.

3. The method of claim 1, wherein the character information editing operation includes an operation in which the first user clicks a character editing button at least one time on a sending interface of the first electronic device, or the character information editing operation includes an operation in which the first user taps on a back cover of the first electronic device.

4. The method of claim 2, wherein the haptic feedback parameter comprises at least one of a haptic feedback intensity, a haptic feedback frequency, and a haptic feedback time.

5. A method for haptic feedback, being applicable to a second electronic device and comprising:

receiving session information from a data platform, wherein the session information is generated by a first electronic device in response to a session information editing operation from a first user and sent to the data platform in response to a sending operation from the first user; wherein the session information includes Morse code character information; and generating haptic feedback according to the session information;

wherein the session information comprises character information and emotional state information sent synchronously with the character information, the character information includes the Morse code character information, and the haptic feedback comprises first haptic feedback according to the character information and second haptic feedback according to the character information and the emotional state information.

6. A first electronic device, comprising:
a processor; and a memory coupled with the processor and storing a computer program which, when executed by the processor, cause the processor to:

generate session information in response to a session information editing operation from a first user, wherein the session information includes Morse code character information; and send, in response to a sending operation from the first user, the session information to a data platform for a second electronic device to obtain the session information from the data platform and generate haptic feedback according to the session information;

wherein the session information editing operation comprises a character information editing operation and an emotional state editing operation, the session information comprises character information and emotional state information sent synchronously with the character information, and the character information includes the Morse code character information, the emotional state information comprises an emotional state and a haptic feedback parameter corresponding to the emotional state.

7. The first electronic device of claim 6, wherein the Morse code character information includes at least one of first character information and second character information.

8. The first electronic device of claim 6, wherein the character information editing operation includes an operation in which the first user clicks a character editing button at least one time on a sending interface of the first electronic device, or the character information editing operation includes an operation in which the first user taps on a back cover of the first electronic device.

9. The first electronic device of claim 7, wherein the haptic feedback parameter comprises at least one of a haptic feedback intensity, a haptic feedback frequency, and a haptic feedback time.

10. A second electronic device, comprising:
processor; and a memory coupled with the processor and storing a computer program which, when executed by the processor, cause the processor to perform the method of claim 5;

wherein the session information comprises character information and emotional state information sent synchronously with the character information, the character information includes the Morse code character information, and the haptic feedback comprises first haptic feedback according to the character information and second haptic feedback according to the character information and the emotional state information.

\* \* \* \* \*